United States Patent
Choi

(10) Patent No.: US 10,717,549 B2
(45) Date of Patent: Jul. 21, 2020

(54) SPACECRAFT FOR SPACE DEBRIS REMOVAL

(71) Applicant: Korea Aerospace Research Institute, Daejeon (KR)

(72) Inventor: Joon Min Choi, Daejeon (KR)

(73) Assignee: Korea Aerospace Research Institute, Daejeon (KR)

(*) Notice: Subject to any disclaimer, the term of this patent is extended or adjusted under 35 U.S.C. 154(b) by 595 days.

(21) Appl. No.: 15/786,209

(22) Filed: Oct. 17, 2017

(65) Prior Publication Data

US 2018/0127115 A1 May 10, 2018

(30) Foreign Application Priority Data

Nov. 10, 2016 (KR) .................. 10-2016-0149407

(51) Int. Cl.
*B64G 1/24* (2006.01)
*B64G 1/22* (2006.01)
*B64G 1/66* (2006.01)
*B64G 1/44* (2006.01)
*B64G 1/56* (2006.01)
(Continued)

(52) U.S. Cl.
CPC ............ *B64G 1/24* (2013.01); *B64G 1/10* (2013.01); *B64G 1/222* (2013.01); *B64G 1/244* (2019.05); *B64G 1/44* (2013.01); *B64G 1/443* (2013.01); *B64G 1/56* (2013.01); *B64G 1/641* (2013.01);
(Continued)

(58) Field of Classification Search
CPC . B64G 1/24; B64G 1/10; B64G 1/222; B64G 1/244; B64G 1/44; B64G 1/443; B64G 1/56; B64G 1/641; B64G 1/66; B64G 1/62; B64G 1/646
See application file for complete search history.

(56) References Cited

U.S. PATENT DOCUMENTS 5,120,008 A * 6/1992 Ramohalli ............... B64G 1/22
244/171.7
5,257,034 A * 10/1993 Turner ................. H01Q 15/161
343/840
(Continued)

FOREIGN PATENT DOCUMENTS

EP  2336031 A1  6/2011
EP  2468629 A1  6/2012
(Continued)

OTHER PUBLICATIONS

European Search Report, EP 17200911.0, dated Apr. 12, 2018.
(Continued)

*Primary Examiner* — Richard R. Green
*Assistant Examiner* — William L Gmoser
(74) *Attorney, Agent, or Firm* — Quarles & Brady LLP

(57) ABSTRACT

A spacecraft for removing space debris is disclosed. The spacecraft includes a satellite bus, a shield member foldable on an outer side face of the satellite bus and disposed facing towards space debris to reduce a movement speed of the space debris, and a support member configured to support the shield member with respect to the satellite bus, in which the shield member includes a central panel configured to overlap one face of the satellite bus, a plurality of first panels connected to peripheral sides of the central panel and radially extended, and a plurality of second panels located between the first panels.

14 Claims, 19 Drawing Sheets

(51) Int. Cl.
*B64G 1/10* (2006.01)
*B64G 1/64* (2006.01)

(52) U.S. Cl.
CPC ............... *B64G 1/66* (2013.01); *B64G 1/242* (2013.01); *B64G 2001/245* (2013.01)

(56) References Cited

U.S. PATENT DOCUMENTS

| | | | |
|---|---|---|---|
| 8,550,407 B2* | 10/2013 | Vezain | B64G 1/66 |
| | | | 136/245 |
| 9,434,485 B1* | 9/2016 | Lehocki | B64G 1/22 |
| 9,714,101 B1* | 7/2017 | Kaplan | B64G 1/1085 |
| 2012/0068018 A1* | 3/2012 | Wright | B64G 1/56 |
| | | | 244/171.7 |
| 2013/0206957 A1 | 8/2013 | Kalman et al. | |
| 2014/0158830 A1* | 6/2014 | Rossettini | B64G 1/403 |
| | | | 244/158.6 |
| 2015/0115107 A1* | 4/2015 | Andoh | B64G 1/242 |
| | | | 244/171.1 |
| 2016/0023781 A1* | 1/2016 | Baudasse | B65H 75/285 |
| | | | 52/108 |
| 2017/0015444 A1* | 1/2017 | Okada | B64G 1/26 |
| 2017/0063296 A1* | 3/2017 | Cruijssen | H02S 40/22 |
| 2017/0313447 A1* | 11/2017 | Reed | B64G 1/242 |
| 2018/0016036 A1* | 1/2018 | Mauro | B64G 1/66 |

FOREIGN PATENT DOCUMENTS

| | | |
|---|---|---|
| GB | 2475926 A1 | 6/2011 |
| JP | H03-118899 U | 12/1991 |
| JP | H05-278698 A | 10/1993 |
| JP | H07277298 A1 | 10/1995 |
| JP | 2001-108193 A | 4/2001 |
| JP | 2002002599 A | 1/2002 |
| JP | 2012131492 A | 7/2012 |
| JP | 2015-199379 A | 11/2015 |

OTHER PUBLICATIONS

Notification of Reasons for Refusal issued in corresponding Japanese Application No. 2017-204283, dated Oct. 30, 2018, 7 pages.

* cited by examiner

10

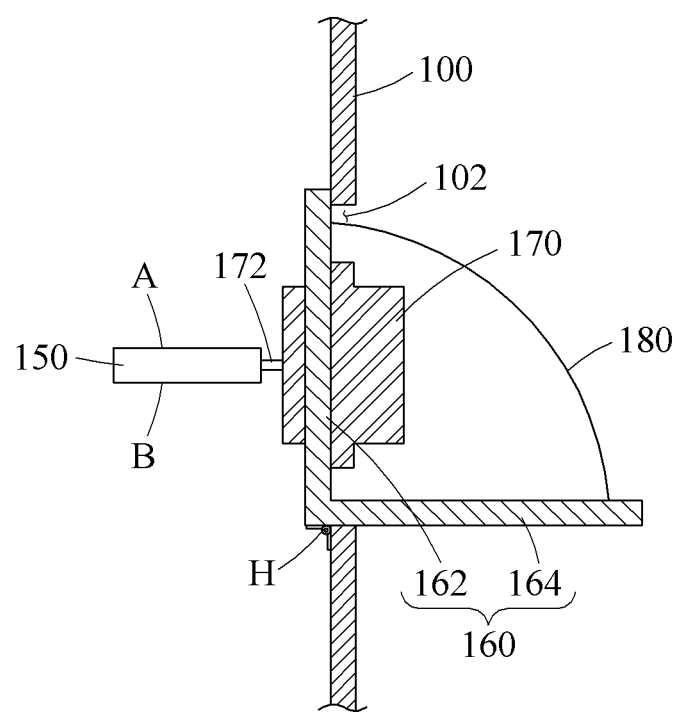

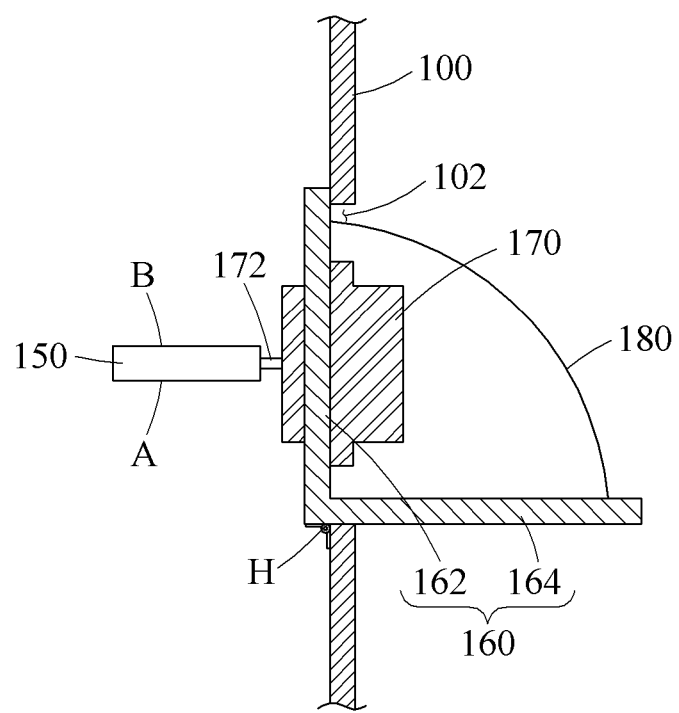

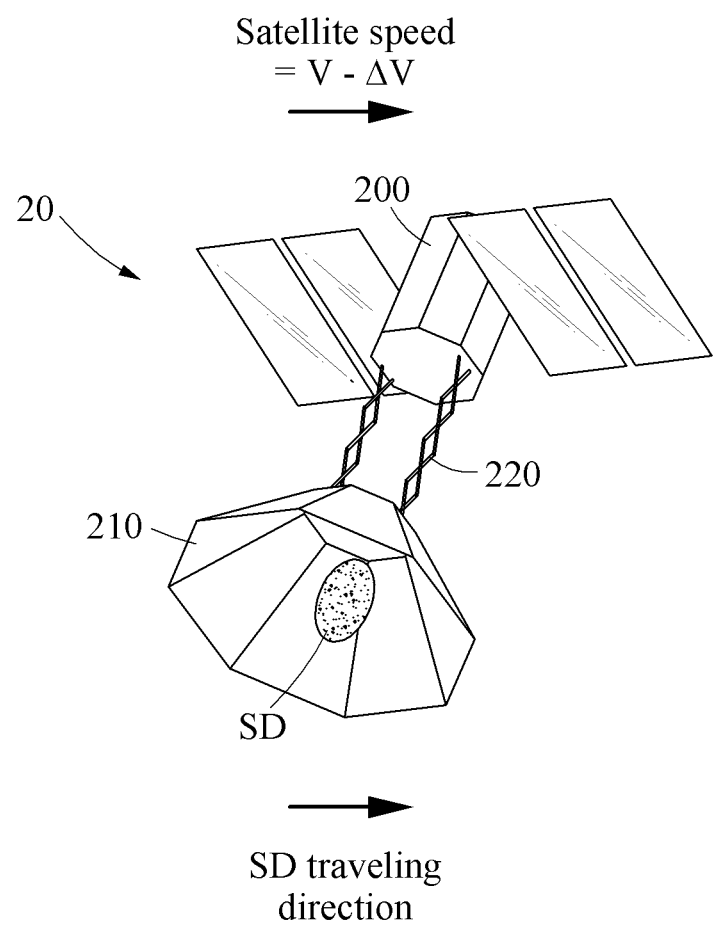

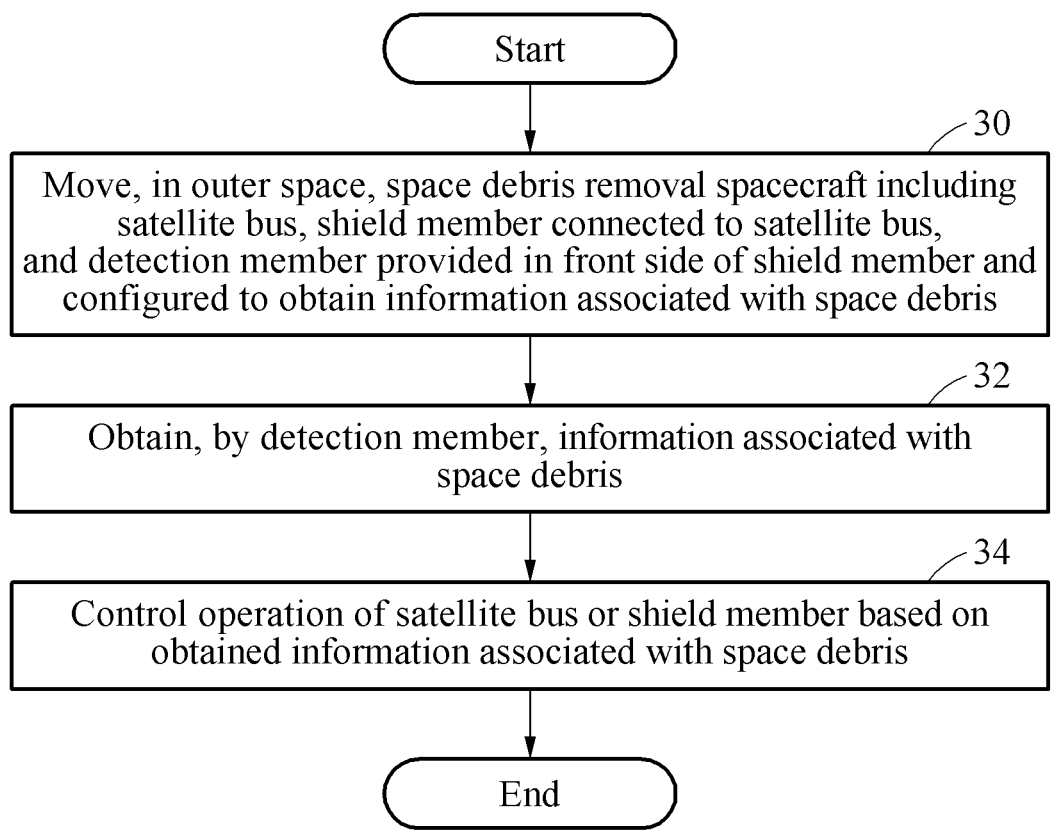

SPACECRAFT FOR SPACE DEBRIS REMOVAL

CROSS-REFERENCE TO RELATED APPLICATION(S)

This application claims the priority benefit of Korean Patent Application No. 10-2016-0149407 filed on Nov. 10, 2016, in the Korean Intellectual Property Office, the disclosure of which is incorporated herein by reference for all purposes.

BACKGROUND

1. Field

One or more example embodiments relate to a spacecraft for removing space debris, and more particularly, to a reusable spacecraft including a shield member to remove space debris.

2. Description of Related Art

An accident may frequently occur due to space debris around the earth. For instance, a US Iridium satellite collided with an inactive Russian Cosmos satellite in February, 2009. It is estimated that the collision produced approximately four million space debris each being greater than 1 millimeters (mm) in size, and also approximately 1,420 space debris each being greater than 10 centimeters (cm) in size.

Recently, various Active Debris Removal(ADR) methods have been suggested in some advanced countries in space field to remove pre-existing space debris in outer space while abiding by Post-Mission Disposal(PMD) guidelines to dispose of a space object itself after a mission is completed, and also satellites have been launched to test such methods to remove space debris.

Below are methods that have been suggested up to the present and are currently in progress.

A first example method is using a clamping mechanism to collect or capture space debris. Through the clamping mechanism, a janitor satellite approaches a space debris and captures the space debris in the same manner as a human being holds an object by hand. The method may need a highly sophisticated technique to obtain accurate coordinates, precisely control an attitude, and precisely capture the space debris. However, the method may not be easily applied to capture space debris that moves unfavorably or has several attachments. In addition, the space debris may need to be smaller than the clamping mechanism, and also a single cleaning satellite may remove only a single piece of space debris.

A second example method is using a net or a harpoon provided in a janitor satellite to collect or capture space debris. Although the method is relatively simple and reliable, the method may be effective only for space debris that is large enough and not effective for a group of small-sized space debris.

A third example method is using a long tether to decrease a speed of space debris and lower an altitude of the space debris to have the space debris be incinerated by frictional heat in the atmosphere, by connecting the long tether to the space debris and allowing an electron in a plasma around the earth to flow in the tether to generate a force by earth's magnetic field. To obtain a desired force, a length of the tether may need to be several hundreds of meters (m) to tens of kilometers (km). However, such a long tether may be cut by space debris with a speed of 7.9 to 11.2 km per second. The cut may result in a breakdown or a failure, and also produce space debris. In addition, it may be difficult to develop a tether-release mechanism and connect the tether to the space debris.

A fourth example method is using baskets at both symmetric and extendable arms of a janitor satellite to collect or capture space debris. A basket on one side of the janitor satellite may capture space debris, and an arm may then rotate and throw the space debris into the atmosphere at an appropriate location to have the space debris be incinerated by frictional heat. However, since the space debris moves at a speed of 7.9 to 11.2 km per second, the arms of the janitor satellite may need to move at a corresponding speed, and an angle similar to a tangential angle of the space debris traveling direction to place the space debris accurately into the baskets. In addition, a size of the space debris may need to be smaller than that of each basket and, in case of failure, the baskets may be damaged.

A fifth example method is attaching a solar sail or a balloon to space debris to generate a drag force and gradually lower an orbit to have the space debris be incinerated by frictional heat in the atmosphere. The method may be economically effective for space debris of a considerable size, and not that effective for space debris in cm size.

A sixth example method is emitting a high-power laser to space debris to evaporate its surface and generate a flume, like a flame from a rocket, to decrease a speed of the space debris. Although the method is the most effective to remove space debris that moves unfavorably irrespective of a shape of the space debris, the method may be extremely expensive and used as an anti-satellite weapon (ASAT), which may cause a political issue. In addition, the method may not be effective to remove large space debris.

The last example method is exploding gas in the stratosphere or using a vortex generator to generate an artificial atmosphere in an area through which space debris passes, in order to decrease a speed of the space debris and finally have the space debris be incinerated by frictional heat in the atmosphere. However, the artificial atmosphere may not reach an altitude of 500 to 1000 km at which the space debris becomes an object of concern. Although the method may be effective for light space debris, the method may not be effective for space debris weighing enough to cause a problem, even if the artificial atmosphere reaches the altitude. In addition, the artificial atmosphere may need to have a radius of at least hundreds of km to decrease a speed of space debris, and may not be kept in a desired place for a long period of time.

SUMMARY

An aspect provides a spacecraft for removing space debris. The spacecraft may be tolerant to accuracy of location coordinates of the space debris, using a shield member provided in a relatively large size, and effectively remove a large amount of accompanying small space debris along with the space debris.

Another aspect also provides a spacecraft for removing space debris. The spacecraft may be repeatedly reusable while a fuel of a thrust member is left, and provided in a simple structure to be easily embodied. In addition, a life of the spacecraft may be extended by using the spacecraft in a preset orbit and refueling the spacecraft.

Still another aspect also provides a spacecraft for removing space debris. The spacecraft may be continuously disposed around International Space Station (ISS) or an expensive satellite to act as a bodyguard. Alternatively, the spacecraft may move to a location at which a large amount of space debris is generated, or be launched from the ground in case of a collision with space debris to rapidly remove the space debris before the space debris is spread throughout the earth.

Yet another aspect also provides a spacecraft for removing space debris. The spacecraft may include a foldable shield member and foldable solar arrays to occupy a minimum space and be launched to outer space. A thrust member provided in a satellite bus may be used to change an attitude of the satellite bus or easily control a movement speed of the satellite bus. The spacecraft may decrease a speed of the space debris to a desired speed, and then move away from the space debris through an avoidance maneuvering or an acceleration movement.

A further another aspect also provides a spacecraft for removing space debris. The spacecraft may include a shield member that may be transformed into a form of a basket, and control an attitude of the satellite bus and effectively lower an altitude, or a perigee, of the space debris to reduce a period of time used for the space debris to enter the atmosphere.

According to an aspect, there is provided a spacecraft for removing space debris, the spacecraft including a satellite bus, a shield member foldable on an outer side face of the satellite bus and disposed facing towards space debris to reduce a movement speed of the space debris, and a support member configured to support the shield member with respect to the satellite bus. The shield member may include a central panel configured to overlap one face of the satellite bus, a plurality of first panels connected to peripheral sides of the central panel and radially extended, and a plurality of second panels located between the first panels.

The satellite bus may be provided in a form of a polygonal column. The first panels may correspond in number to faces of the satellite bus and overlap the outer side face of the satellite bus, and the second panels may overlap the first panels.

When the first panels and the second panels are unfolded, the shield member may be transformed into a form of a disc or a basket.

The support member may be provided in a contractible or expandable structure. While the shield member is being unfolded, one end of the support member may be connected to one face of the satellite bus, and another end of the support member may be connected to a back face of the central panel.

The spacecraft may further include a detection member provided at a center of the central panel and configured to detect the space debris. The detection member may measure the movement speed of the space debris or a distance between the space debris and the shield member.

The spacecraft may include a speed control thrust member configured to control a movement speed of the satellite bus such that the satellite bus is able to approach the space debris or move away from the space debris, and an attitude control thrust member configured to adjust an attitude of the satellite bus such that the shield member faces towards the space debris or avoids the space debris. The speed control thrust member and the attitude control thrust member may be disposed on one face or another face of the satellite bus.

The attitude control thrust member may control the shield member to face towards the earth, and the speed control thrust member may add an earth-direction speed to the space debris and lower an altitude, or a perigee, of the space debris.

The spacecraft may further include a solar array connected to a side face of the satellite bus and configured to convert solar energy to electrical energy in outer space, a connection member hingedly connected to the side face of the satellite bus, and a driving member provided in the connection member and configured to rotate the solar array on a drive shaft. The solar array and the driving member may rotate together by a rotation of the connection member.

Solar cells may be provided on one face of the solar array, and not be provided on another face of the solar array. The solar array may be folded, by the connection member, in a direction in which the solar array is separated further from the shield member, on the side face of the satellite bus, to be parallel to the satellite bus, in order to prevent surfaces of the solar cells from being polluted or damaged by fine dust while the space debris is being removed.

The connection member may be provided in an L shape. A vertex portion in the L shape may be hingedly connected to the side face of the satellite bus, and a longitudinally extended portion in the L shape may cover an opening formed on the side face of the satellite bus and a laterally extended portion in the L shape may be inserted in the satellite bus. The longitudinally extended portion in the L shape may rotate on the vertex portion in the L shape outside the satellite bus, and the laterally extended portion in the L shape may rotate on the vertex portion in the L shape inside the satellite bus.

When the space debris approaches, the solar array may be rotated by the driving member such that one face (solar cell side) of the solar array is disposed in a direction opposite to that of the shield member, and then be folded in a direction in which the solar array is separated further from the shield member, on the side face of the satellite bus, by the connection member such that one face of the solar array is parallel to the side face of the satellite bus.

The spacecraft may further include an insulation member provided in the connection member and configured to prevent the driving member from being externally exposed.

According to another aspect, there is provided a spacecraft for removing space debris, the spacecraft including a satellite bus, a shield member connected to the satellite bus and configured to reduce a movement speed of space debris, a detection member provided in a front side of the shield member and configured to obtain information associated with the space debris, and a controller configured to control an operation of the satellite bus or the shield member based on the information associated with the space debris that is obtained by the detection member. The controller may control a movement speed of the satellite bus, an attitude of the satellite bus, or a degree of spread of the shield member, based on external information (i.e. size, shape, the number of the space debris), a relative speed or the movement speed of the space debris.

When the space debris is captured by the shield member, the controller may control the movement speed of the satellite bus, change the attitude of the satellite bus to allow the shield member to face towards the space debris, and control the degree of spread of the shield member such that the shield member is able to accommodate the space debris.

The controller may control the movement speed of the satellite bus to be greater than the movement speed of the space debris such that the satellite bus is positioned in front of the space debris in a travelling direction of the space debris.

When the space debris is captured in the shield member, the controller may maintain the movement speed of the satellite bus to be less than the movement speed of the space debris, and control the movement speed of the satellite bus to allow the movement speed of the space debris to reach a preset speed.

In response to the movement speed of the space debris being reduced by the shield member, the controller may change the attitude of the satellite bus such that the shield member avoids the space debris, and increase the movement speed of the satellite bus such that the shield member moves further away from the space debris.

The controller may change the attitude of the satellite bus such that the shield member faces towards the earth, and increase the movement speed of the satellite bus to add an earth-direction speed to the space debris.

According to still another aspect, there is provided a method of controlling a spacecraft for removing space debris, the method including moving, in outer space, the spacecraft including a satellite bus, a shield member connected to the satellite bus, and a detection member provided in a front side of the shield member and configured to obtain information associated with space debris, obtaining the information associated with the space debris by the detection member, and controlling an operation of the satellite bus or the shield member based on the obtained information associated with the space debris. The controlling of the operation of the satellite bus or the shield member based on the obtained information may include controlling a movement speed of the satellite bus, an attitude of the satellite bus, or a degree of spread of the shield member, based on external information (i.e. size, shape, number of the space debris), a relative speed or a movement speed of the space debris.

The spacecraft may further include a solar array connected to a side face of the satellite bus and configured to convert solar energy to electrical energy in outer space, and the controlling of the operation of the satellite bus or the shield member based on the obtained information may include controlling an operation of the solar array such that the solar array is folded in a direction in which the solar array is separated further from the shield member, on the side face of the satellite bus, to be parallel to the satellite bus, based on the obtained information.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which:

FIGS. 7A through 7C illustrate an example of operations of a solar array to selectively protect solar cells according to an example embodiment;

FIGS. 14A and 14B illustrate another example of a process of how a spacecraft for removing space debris removes space debris according to another example embodiment; and FIG. 15 is a flowchart illustrating an example of a method of controlling a spacecraft for removing space debris according to an example embodiment.

DETAILED DESCRIPTION

Figure 1:
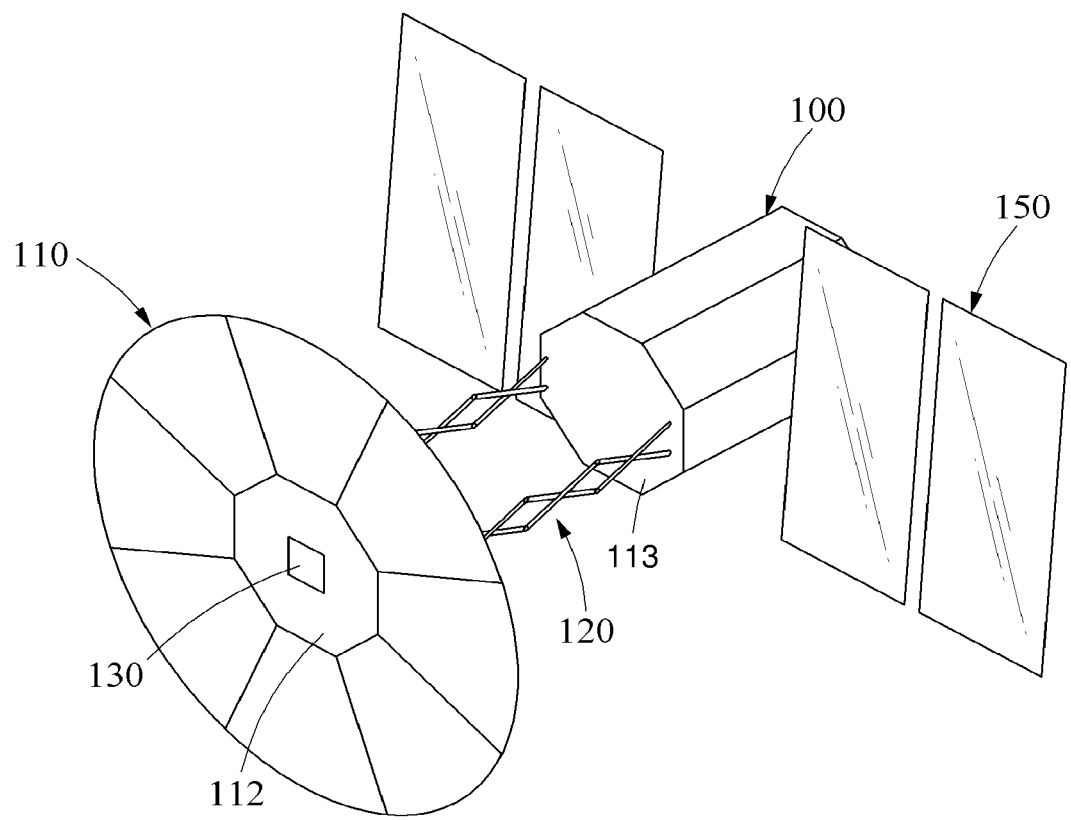
FIG. 1 is a perspective view illustrating an example of a spacecraft for removing space debris according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component. It should be noted that if it is described in the disclosure that one component is "connected," "coupled," or "joined" to another component, a third component may be "connected," "coupled," and "joined" between the first and second components, although the first component may be directly connected, coupled or joined to the second component. In addition, it should be noted that if it is described in the disclosure that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Figure 2:
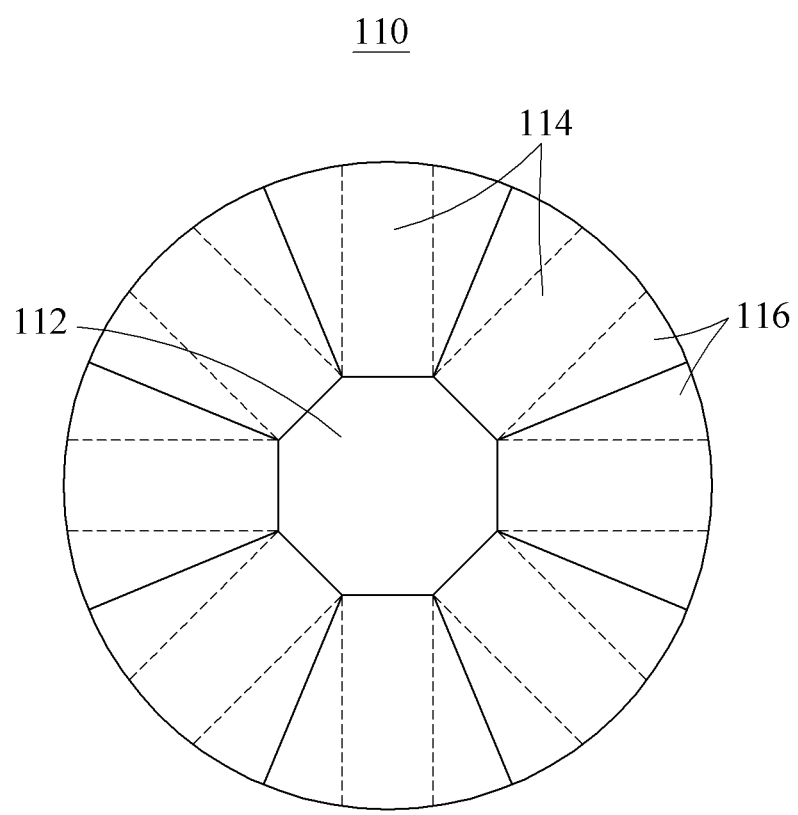
FIG. 2 is a top view illustrating an example of a completely unfolded shield member according to an example embodiment.
Figure 3A:
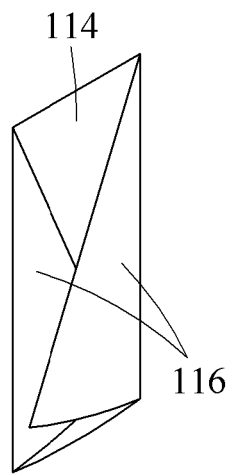
FIGS. 3A and 3B illustrate an example of a shield member in which a second panel is folded on a first panel and an example of the shield member in which the second panel is unfolded from the first panel according to an example embodiment.
Figure 3B:
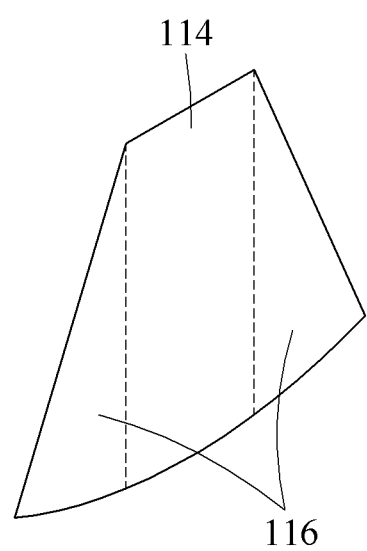
Figure 5:
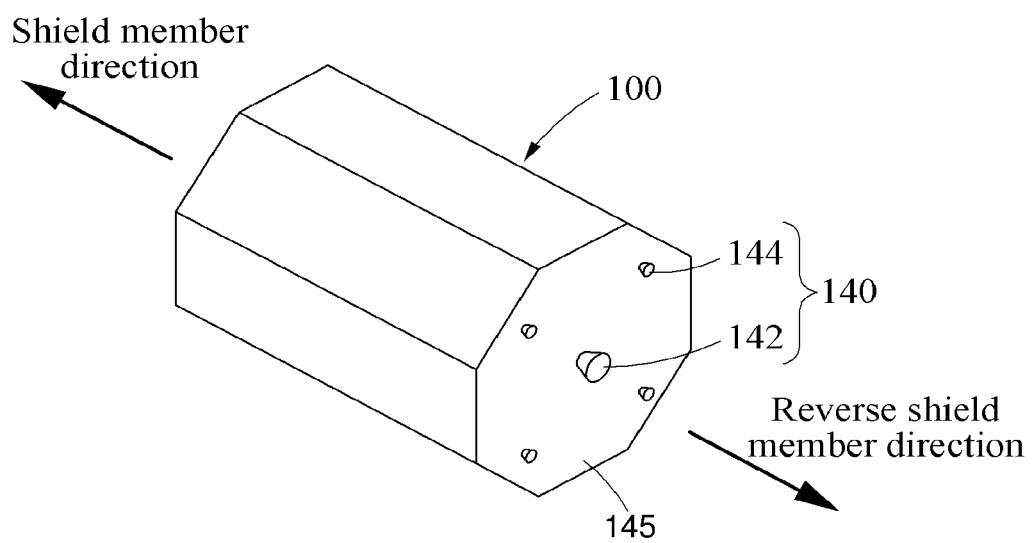
FIG. 5 is a perspective view illustrating an example of disposition of a first speed control thrust member and a first attitude control thrust member according to an example embodiment.
Figure 6:
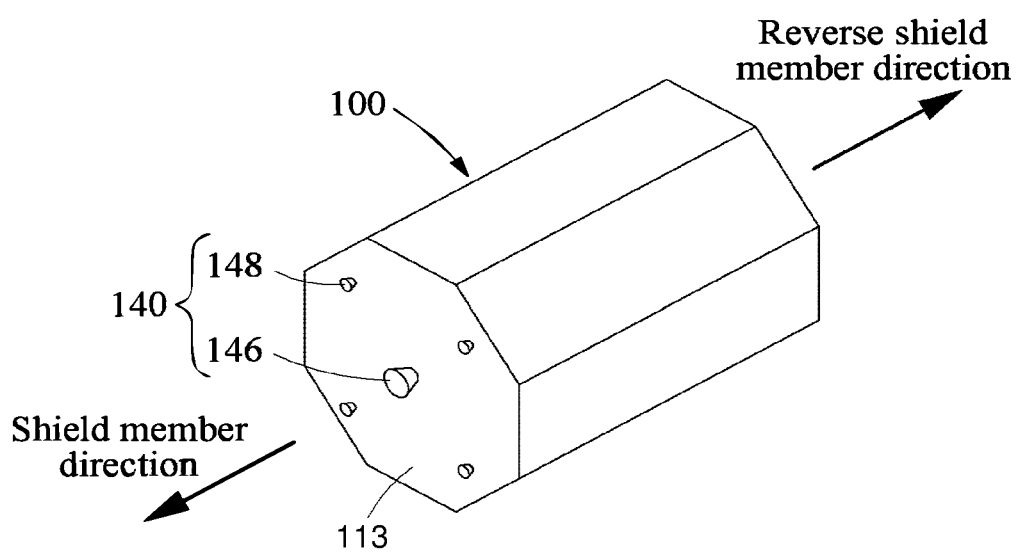
FIG. 6 is a perspective view illustrating an example of disposition of a second speed control thrust member and a second attitude control thrust member according to an example embodiment.
Figure 7C:
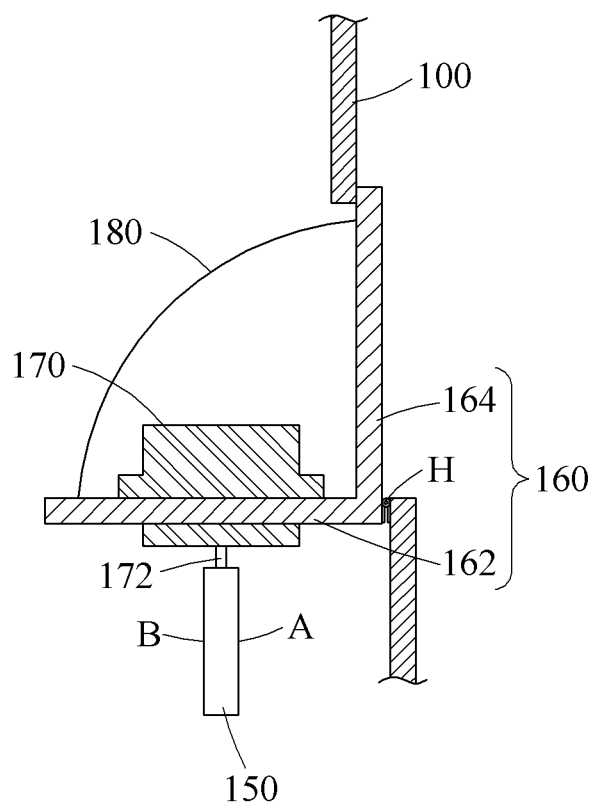

FIG. 1 is a perspective view illustrating an example of a spacecraft for removing space debris according to an example embodiment. The spacecraft for removing space debris will be simply referred to as a space debris removal spacecraft hereinafter. FIG. 2 is a top view illustrating an example of a completely unfolded shield member according to an example embodiment. FIGS. 3A and 3B illustrate an example of a shield member in which a second panel is folded on a first panel and an example of the shield member in which the second panel is unfolded from the first panel, respectively, according to an example embodiment. FIGS. 4A through 4E illustrate an example of a process of how a shield member is unfolded according to an example embodiment. FIG. 5 is a perspective view illustrating an example of disposition of a first speed control thrust member and a first attitude control thrust member according to an example embodiment. FIG. 6 is a perspective view illustrating an example of disposition of a second speed control thrust member and a second attitude control thrust member according to an example embodiment. FIGS. 7A through 7C illustrate an example of an operation of a solar array to selectively protect solar cells according to an example embodiment. FIGS. 8 through 11 illustrate an example of a process of how a space debris removal spacecraft removes space debris according to an example embodiment.

Referring to FIG. 1, a space debris removal spacecraft 10 includes a satellite bus 100, a shield member 110, a support member 120, a detection member 130, a plurality of thrust members 140 as illustrated in FIGS. 5 and 6, and a solar array 150.

The satellite bus 100 is disposed inside a launch vehicle to move to outer space. In the satellite bus 100, various devices may be provided to operate the space debris removal spacecraft 10.

The satellite bus 100 may be provided in a form of a polygonal column.

Although the satellite bus 100 is illustrated as being provided in a form of an octagonal column, a form of the satellite bus 100 is not limited to the illustrated example and any form in which the shield member 110 overlaps an outer face of the satellite bus 100 and the support member 120 and the thrust members 140 are provided may also be used.

The shield member 110 may be connected to the satellite bus 100.

Referring to FIG. 2, the shield member 110 includes a central panel 112, a plurality of first panels 114, and a plurality of second panels 116.

The central panel 112 may overlap one face, for example, a face indicated by 113, of the satellite bus 100.

For example, the central panel 112 may overlap an upper face of the satellite bus 100, and accordingly a shape of the central panel 112 may be provided in a same octagonal shape as the upper face of the satellite bus 100.

The first panels 114 may be provided to be folded or unfolded on an outer side of the central panel 112.

A number of the first panels 114 may correspond to a number of faces of the satellite bus 100. For example, eight first panels 114 corresponding to a number of side faces of the satellite bus 100 may be provided, each being connected to each of side faces of the central panel 112.

Here, the first panels 114 may be radially extended from a center of the central panel 112. The first panels 114 may be provided in a form corresponding to the outer side face of the satellite bus 100 or a form slightly smaller than the outer side face of the satellite bus 100 to overlap the outer side face of the satellite bus 100.

In addition, when the shield member 110 is unfolded or spread, a gap may be formed between the first panels 114.

To close such a space, the second panels 116 may be connected between the first panels 114. For example, two second panels 116 may be disposed in the gap formed between the first panels 114.

Each of the second panels 116 may be provided in a fan shape, which overlaps the first panels 114.

In detail, referring to FIG. 3A, the second panels 116 may be connected to both sides of each of the first panels 114. When the shield member 110 is folded, the second panels 116 may overlap the first panels 114, and the second panels 116 may also overlap each other. Here, the second panels 116 may overlap the first panels 114 in a space direction or a direction opposite to the space direction.

Referring to FIG. 3B, when the shield member 110 is unfolded, each of the first panels 114 and the second panels 116 connected to both sides of each of the first panels 114 may form a trapezoidal shape on a same plane. Here, the second panels 116 may be unfolded from the first panels 114 towards the space direction.

Although the central panel 112, the first panels 114, and the second panels 116 are illustrated in FIG. 1 or 2 as being formed in a disc shape on a same plane when the shield member 110 is completely unfolded, the shield member 110 may be provided in a form of a basket to have a receiving or accommodating space in the shield member 110. Alternatively, it is obvious that a degree of folding or unfolding (or spread) of the shield member 110 may be controlled using an electrically-powered gear device.

Referring to FIGS. 4A through 4E, the shield member 110 may be unfolded as described hereinafter.

Figure 4A:
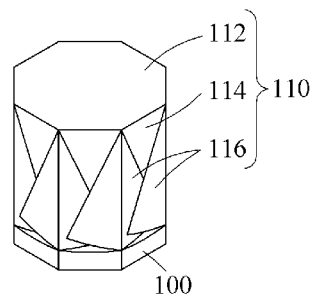
FIGS. 4A through 4E illustrate an example of a process of how a shield member is unfolded according to an example embodiment.

Referring to FIG. 4A, to reduce a volume of the space debris removal spacecraft 10 in the launch vehicle, the shield member 110 may be maintained as being folded. In detail, the central panel 112 may overlap one face or the upper face of the satellite bus 100, the first panels 114 overlap the outer side face of the satellite bus 100, and the second panels 116 overlap the first panels 114.

Although not illustrated in detail, the solar array 150 may also be maintained as being folded on the satellite bus 100. For example the solar array 150 may be maintained as being folded on the outer side face of the satellite bus 100 towards an inner side of the shield member 110.

Figure 4B:
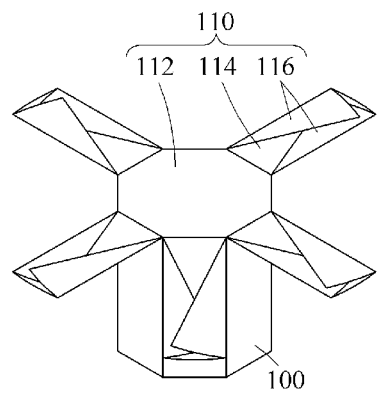

Referring to FIG. 4B, some of the first panels 114 may be unfolded from the outer side face of the satellite bus 100. For example, four first panels 114 of eight first panels 114, which are disposed on opposite side faces of the satellite bus 100, may be unfolded from the outer side face of the satellite bus 100. Thus, the central panel 112 and some of the first panels 114 may be disposed on a same plane. Conversely, remaining first panels 114 of the first panels 114 may be maintained as being folded on the outer side face of the satellite bus 100.

Figure 4C:
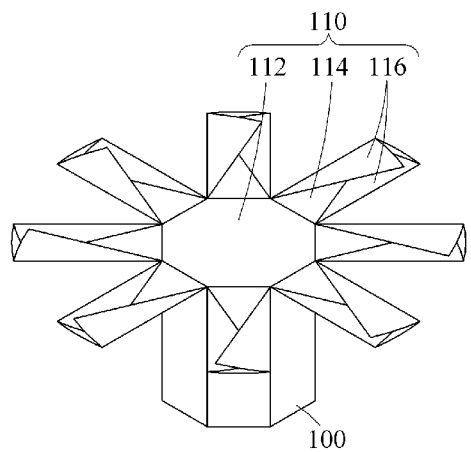

Referring to FIG. 4C, the remaining first panels 114 of the first panels 114 may also be unfolded from the outer side face of the satellite bus 100. Thus, all the first panels 114 folded on the outer side face of the satellite bus 100 may be unfolded such that the central panel 112 and the first panels 114 form a same plane. However, all the second panels 116 may be maintained as overlapping the first panels 114. Thus, a gap may be formed between the first panels 114.

Figure 4D:
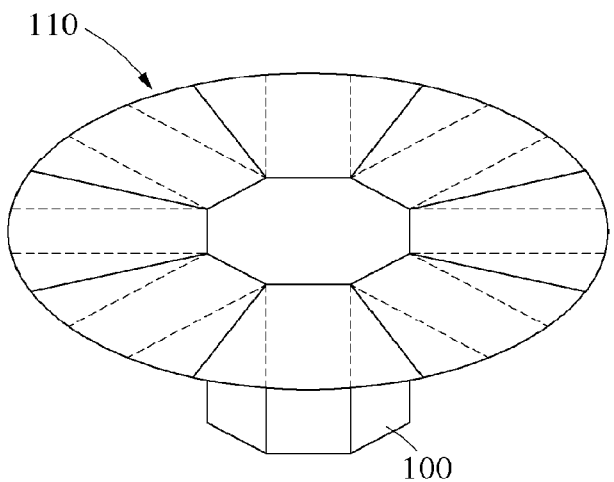

Referring to FIG. 4D, the second panels 116 may all be unfolded from the first panels 114, and the shield member 110 may thus be formed in a disc shape. The shield member 110 may be provided in a relatively large size, and thus be tolerant to accuracy of location coordinates of space debris.

Figure 4E:
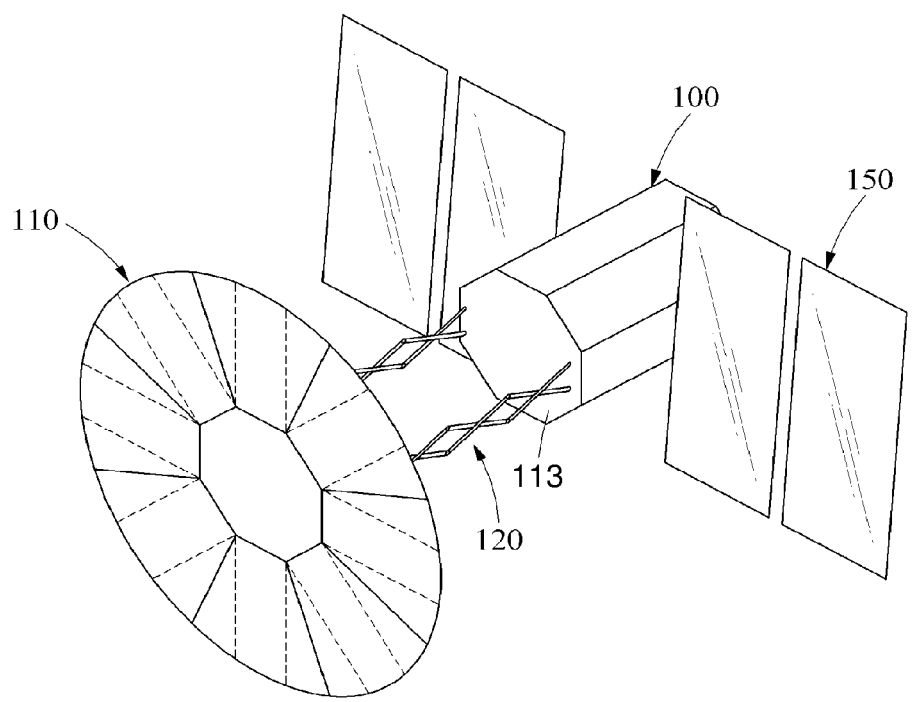

Referring to FIG. 4E, the support member 120 and the solar array 150 may also be unfolded from the satellite bus 100, and the shield member 110 may thus be disposed further from the satellite bus 100 and receive electrical energy from the solar array 150.

Referring back to FIG. 1, the support member 120 may support the shield member 110 with respect to the satellite bus 100.

One end of the support member 120 may be connected to one face, for example, the face 113, of the satellite bus 100, and another end of the support member 120 may be connected to a back face of the shield member 110, or a back face of the central panel 112 in particular.

In addition, the support member 120 may be provided in a contractible or expandable structure.

In detail, when the satellite bus 100 is maintained in the launch vehicle, the support member 120 may be maintained as being contracted between the shield member 110 and the satellite bus 100 such that the shield member 100 is maintained as being folded on the one face 113 of the satellite bus 100.

Conversely, during a normal operation of the space debris removal spacecraft 10, the support member 120 may be expanded between the shield member 110 and the satellite bus 100 such that the shield member 110 is separated further from the satellite bus 100. Here, by controlling such a contraction or expansion of the support member 120, a distance between the shield member 110 and the satellite bus 100 may be adjusted.

In addition, the detection member 130 configured to detect space debris may be provided at the center of the shield member 110, for example, the center of the central panel 112.

The detection member 130 may be provided as, for example, a light detection and ranging (LIDAR) sensor or a radio detection and ranging (RADAR) sensor that may detect space debris positioned in front of the shield member 110. Thus, the detection member 130 may detect the space debris, and also measure a distance between the shield member 110 and the space debris, and a relative speed, a movement speed, or an angular speed of the space debris, and the like. In addition, it is obvious that the detection member 130 may obtain an image of the space debris as necessary. As described, the detection member 130 may obtain various sets of information needed to remove the space debris.

Referring to FIGS. 5 and 6, the thrust members 140 may be provided in the satellite bus 100.

Although a detailed design of the thrust members 140 is not illustrated, any device that may adjust a speed or an attitude of the satellite bus 100 may be used.

The thrust members 140 include a first speed control thrust member 142 and a first attitude control thrust member 144.

The first speed control thrust member 142 and the first attitude control thrust member 144 may be provided on another face, for example, a face indicated by 145, of the satellite bus 100, which is disposed in a reverse direction of the shield member 110.

In detail, the first speed control thrust member 142 may be disposed at a center of the other face 145 of the satellite bus 100, and used as a main speed control thruster.

For example, the first speed control thrust member 142 may control a movement speed of the satellite bus 100 such that the space debris removal spacecraft 10 may rapidly approach space debris and be positioned in front of the space debris in a traveling direction of the space debris.

In addition, the first attitude control thrust member 144 may be disposed adjacent to an outer side on the other face 145 of the satellite bus 100, and used as a main attitude control thruster.

In detail, the first attitude control thrust member 144 may be provided as four first attitude control thrust members 144 disposed separately from one another on an outer side relative to a center of the first speed control thrust member 142.

For example, the first attitude control thrust member 144 may control an attitude of the satellite bus 100 such that the space debris removal spacecraft 10 is disposed in front of space debris in a traveling direction of the space debris by the first speed control thrust member 142, and then the shield member 110 faces towards the space debris.

The thrust members 140 also include a second speed control thrust member 146 and a second attitude control thrust member 148.

The second speed control thrust member 146 and the second attitude control thrust member 148 may be provided on the one face 113 of the satellite bus 100 disposed in a direction of the shield member 110.

In detail, the second speed control thrust member 146 may be disposed at a center of the one face 113 of the satellite bus 100, and the second attitude control thrust member 148 may be provided as a plurality of second attitude control thrust members 148 disposed separately from one another on an outer side relative to the second speed control thrust member 146 on the one face 113 of the satellite bus 100.

For example, when a movement speed of space debris reaches a preset value, the second attitude control thrust member 148 may control an operation of the satellite bus 100 to allow the shield member 110 to avoid the space debris, and the second speed control thrust member 146 may control a movement speed of the satellite bus 100 to allow the shield member 110 to move further away from the space debris.

Although one first speed control thrust member 142 and one second speed control thrust member 146 are illustrated, and four first attitude control thrust members 144 and four second attitude control thrust members 148 are illustrated, the first speed control thrust member 142 and the first attitude control thrust member 144, and the second speed control thrust member 146 and the second attitude control thrust member 148 may be provided as a pair, respectively, to improve reliability.

In addition, although not illustrated in detail, the support member 120 may be connected to the one face 113 of the satellite bus 100 as described above, and thus it is obvious that the second speed control thrust member 146 and the second attitude control thrust member 148 may be provided on the one face 113 of the satellite bus 100 by avoiding the support member 120.

Referring back to FIG. 1, the solar array 150 may be connected to a side face of the satellite bus 100.

The solar array 150 may be provided as a plurality of solar arrays 150 connected to opposite side faces of the satellite bus 100. For example, two solar arrays 150 may be connected to one side face of the satellite bus 100, and two other solar arrays 150 may be connected to another side face of the satellite bus 100.

When the satellite bus 100 is inside the launch vehicle, the solar arrays 150 may overlap each other, or the overlapping solar arrays 150 may also overlap the outer side face of the satellite bus 100. As described above, the solar arrays 150 may overlap the outer side face of the satellite bus 100, more inside than the shield member 110. Thus, after the shield member 110 is unfolded from the satellite bus 100 on a mission orbit, the solar arrays 150 may then be unfolded from the satellite bus 100.

The solar arrays 150 may convert solar energy to electrical energy in outer space, and the electrical energy obtained from the solar arrays 150 may be used to operate the thrust members 140 or other devices provided in the satellite bus 100. As necessary, solar cells may be installed to a side face of the satellite bus 100 without an addition of the solar array 150.

In a case in which space debris is not a single object of a certain size, but spreads widely and approaches in fine-size group, and the shield member 110 is not able to block all fine objects, the solar array 150, or a surface of the solar cell in particular, may be severely damaged by such a space debris.

Referring to FIGS. 7A through 7C, the space debris removal spacecraft 10 further includes a connection member 160, a driving member 170, and an insulation member 180.

The solar cell may be provided on one face A of the solar array 150, for example, a surface of the solar array 150 that faces the shield member 110, and not be provided on another face B of the solar array 150, for example, a surface of the solar array 150 that faces a direction opposite to that of the shield member 110.

The connection member 160 may be hingedly connected to a side face of the satellite bus 100.

For example, an opening 102 may be formed on the side face of the satellite bus 100, and the connection member 160 may be connected to the opening 102 through a hinge H.

In detail, the connection member 160 may be provided in an L shape. In the L shape, a vertex portion may be hingedly connected to the side face of the satellite bus 100, a longitudinally extended portion 162 may cover the opening 102 formed on the side face of the satellite bus 100, and a laterally extended portion 164 may be inserted in the satellite bus 100.

The longitudinally extended portion 162, which is a portion longitudinally extended through such a hinge connection in the L shape, may rotate on the vertex portion in the L shape outside the satellite bus 100. The laterally extended portion 164, which is a portion laterally extended through such a hinge connection in the L shape, may rotate on the vertex portion in the L shape inside the satellite bus 100.

In addition, the driving member 170 may be provided as a solar array drive assembly (SADA) to align the solar array 150 with the sun at a right angle.

The driving member 170 includes a drive shaft 172 extended from the connection member 160 towards one side face of the solar array 150, and may rotate the solar array 150 based on the drive shaft 172.

As illustrated in FIGS. 7A and 7B, when space debris approaches, the solar array 150 may be rotated by the driving member 170 such that the one face A of the solar array 150 is disposed to face a direction opposite to that of the shield member 110.

The solar array 150 may be rotated by the driving member 170, and thus it is possible to primarily prevent the solar cell provided on the one face A of the solar array 150 from colliding with space debris.

Subsequently, the solar array 150 may be folded to be separated further from the shield member 110, on the side face of the satellite bus 100, by a rotation of the connection member 160 and then become parallel to the satellite bus 100, and thus it is possible to secondarily prevent the solar array 150 from colliding with the space debris.

Here, by the rotation of the connection member 160, the solar array 150 and the driving member 170 connected to the solar array 150 may be rotated together by approximately 90° counterclockwise.

In detail, by the rotation of the connection member 160 as illustrated in FIG. 7C, the one face A of the solar array 150 may be disposed to face the side face of the satellite bus 100, and the other face B of the solar array 150 may be disposed to face the direction opposite to that of the side face of the satellite bus 100.

Thus, both the one face A and the other face B of the solar array 150 may be protected against space debris. However, since the other face B of the solar array 150 is disposed facing towards outer space, there is a possibility of a collision with space debris. Thus, it is obvious that electrical wires provided on the other face B of the solar array 150 may be additionally protected.

In addition, the connection member 160 includes the insulation member 180.

The insulation member 180 may be provided to prevent the driving member 170 from being exposed to outer space.

Thus, any shape or material that may effectively prevent the driving member 170 from an exposure to outer space may be used for the insulation member 180.

Although not illustrated in detail, the space debris removal spacecraft 10 further includes a controller (not shown) to control an overall operation of the space debris removal spacecraft 10.

The controller may control an operation of the satellite bus 100, the shield member 110, the support member 120, the thrust members 140, or the solar array 150, based on information associated with space debris, which is obtained by the detection member 130.

For example, the controller may control a movement speed or an attitude of the satellite bus 100, or a degree of spread of the shield member 110, based on external information (i.e. size, shape, the number of the space debris), a relative speed or a movement speed of space debris that is obtained by the detection member 130.

In detail, the controller may control the movement speed of the satellite bus 100 by controlling an operation of the first speed control thrust member 142, and control the attitude of the satellite bus 100 by controlling an operation of the first attitude control thrust member 144, based on the relative speed or the movement speed of the space debris that is obtained by the detection member 130.

Also, the controller may control the degree of spread of the shield member 110 based on size information of the space debris that is obtained by the detection member 130. For example, in response to the space debris being large in size, the controller may control the degree of spread of the shield member 110 such that the shield member 110 is fully unfolded to be in a disc shape.

Conversely, in response to the space debris being small in size, the controller may control the degree of spread of the shield member 110 such that the shield member 110 is able to accommodate or receive the space debris.

In addition, it is obvious that the controller may transmit a control signal to control various related operations of the space debris removal spacecraft 10.

Referring to FIGS. 8 through 11, the space debris removal spacecraft 10 may remove space debris.

Figure 8:
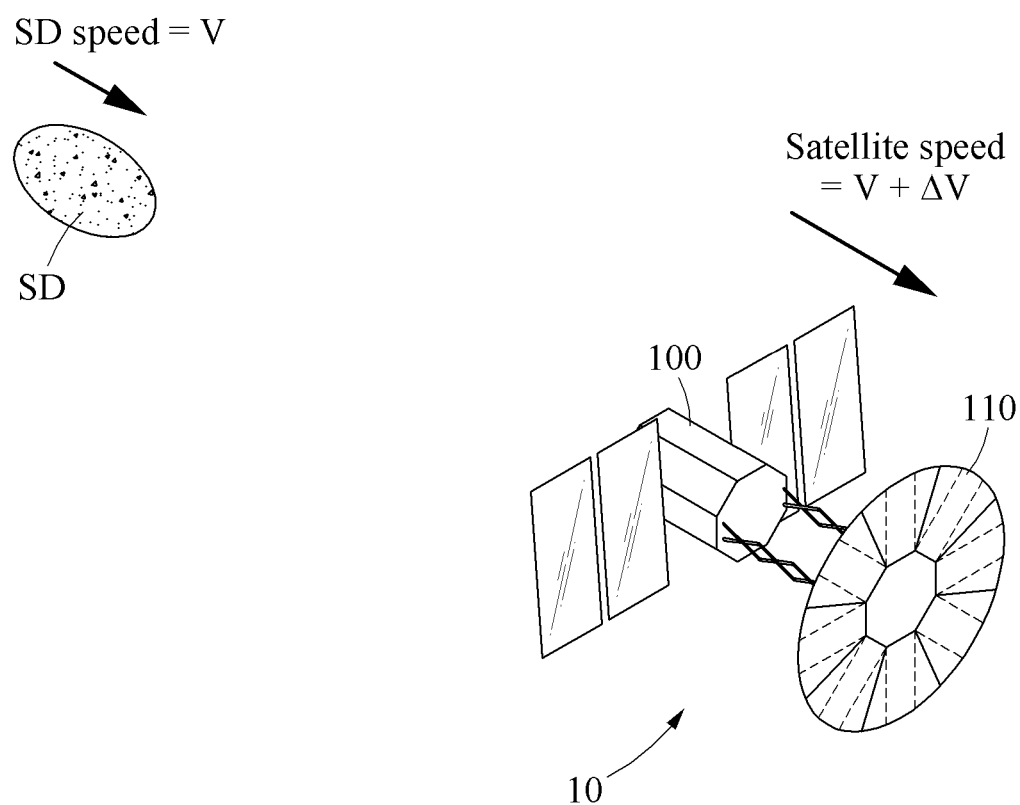
FIGS. 8 through 11 illustrate an example of a process of how a spacecraft for removing space debris removes space debris according to an example embodiment.

Referring to FIG. 8, when the presence of space debris, which is indicated by SD, is detected by the detection member 130, the space debris removal spacecraft 10 may move to be positioned in front of the space debris.

Here, when a movement speed of the space debris is V, the space debris removal spacecraft 10 may move at a speed of V+ΔV, which is greater than the movement speed V of the space debris, to be positioned in front of the space debris.

For example, for such a movement of the space debris removal spacecraft 10, the first speed control thrust member 142 may be used. Here, an operation of the first speed control thrust member 142 and a speed control variable ΔV may be controlled by the controller.

Figure 9:
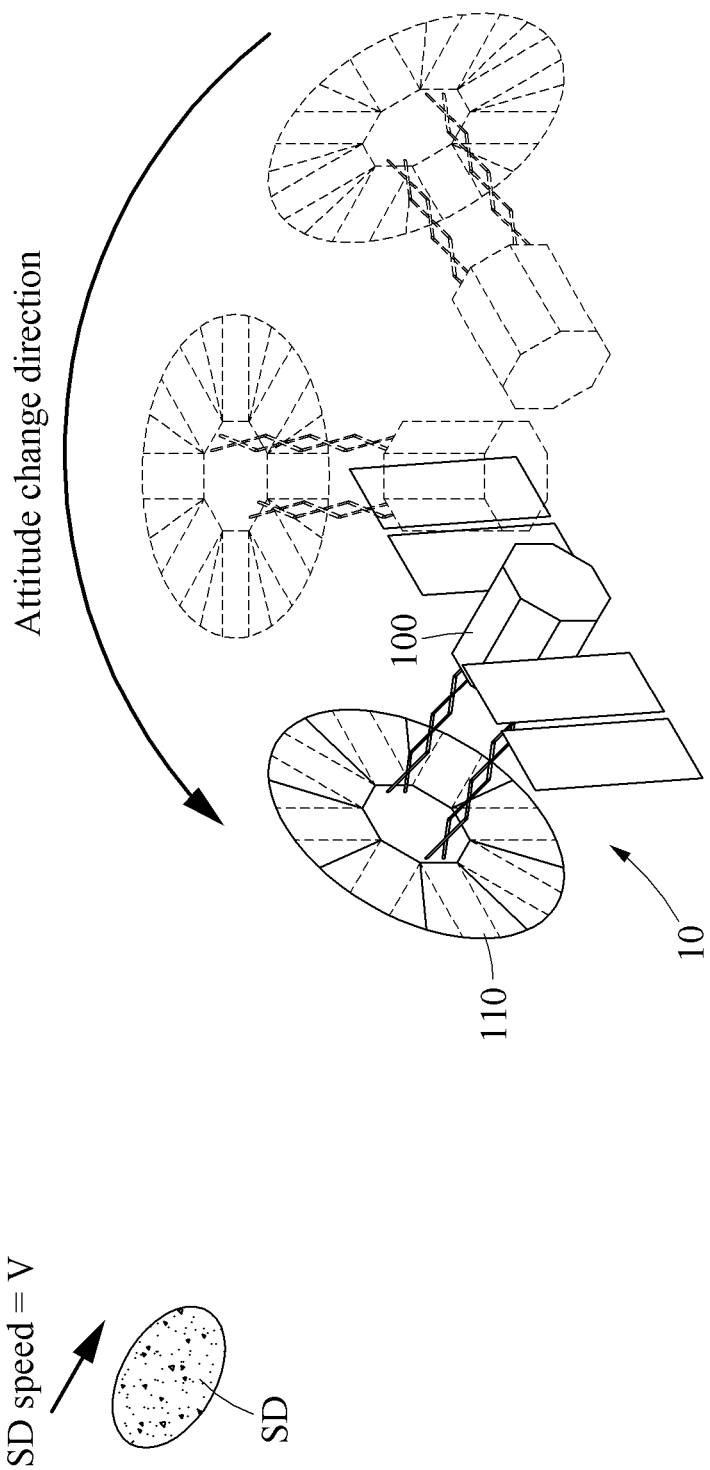

Referring to FIG. 9, an attitude of the space debris removal spacecraft 10 that is positioned in front of the space debris may be changed such that the shield member 110 faces towards the space debris.

For example, the satellite bus 100 may be rotated counterclockwise to allow the shield member 110 to face towards the space debris. For such a movement, the first attitude control thrust member 144 may be used. Here, an operation of the first attitude control thrust member 144 and a rotation angle of the satellite bus 100 may be controlled by the controller.

Figure 10:
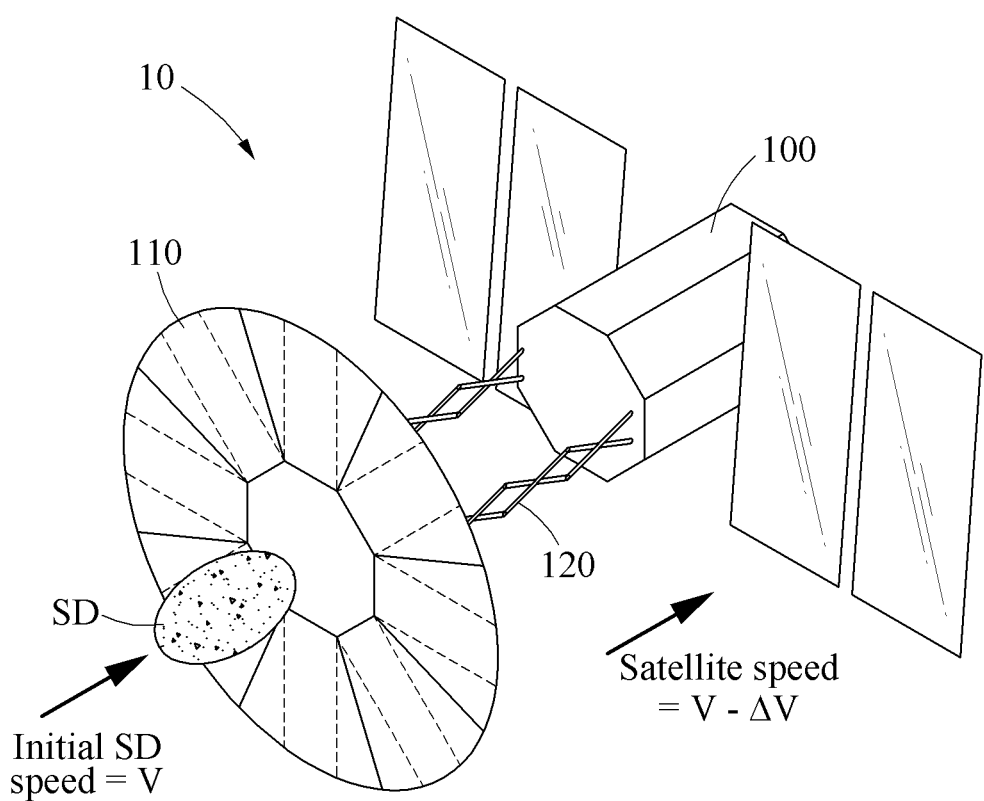

Referring to FIG. 10, the space debris removal spacecraft 10 of which the shield member 110 is arranged to face towards the space debris may maintain a speed of V−ΔV, which is less than the movement speed V of the space debris. Here, the speed control variable ΔV may be set to prevent damage of the shield member 110, or controlled by the controller. Thus, a value of ΔV may slowly increase to allow the movement speed V of the space debris to reach a preset value.

Figure 11:
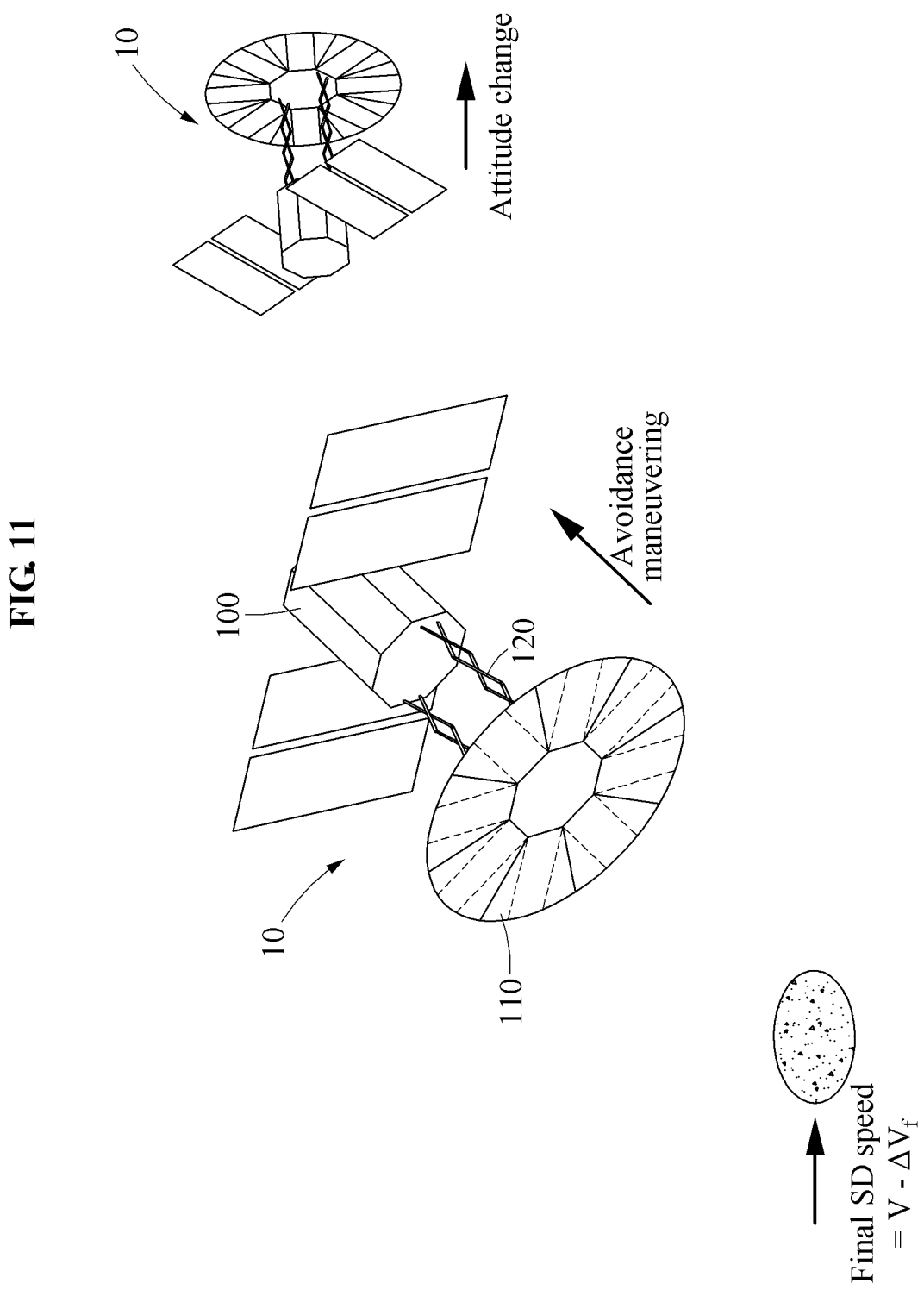

Referring to FIG. 11, when the movement speed V of the space debris reaches the preset value, for example, V−ΔV$_f$, by the shield member 110, the space debris removal spacecraft 10 may avoid the space debris using the second attitude control thrust member 148, or be accelerated to move further away from the space debris using the second speed control thrust member 146.

Subsequently, the space debris removal spacecraft 10 may change the attitude thereof by 180° using the first attitude control thrust member 144, and track another space debris using the first speed control thrust member 142.

Figure 12:
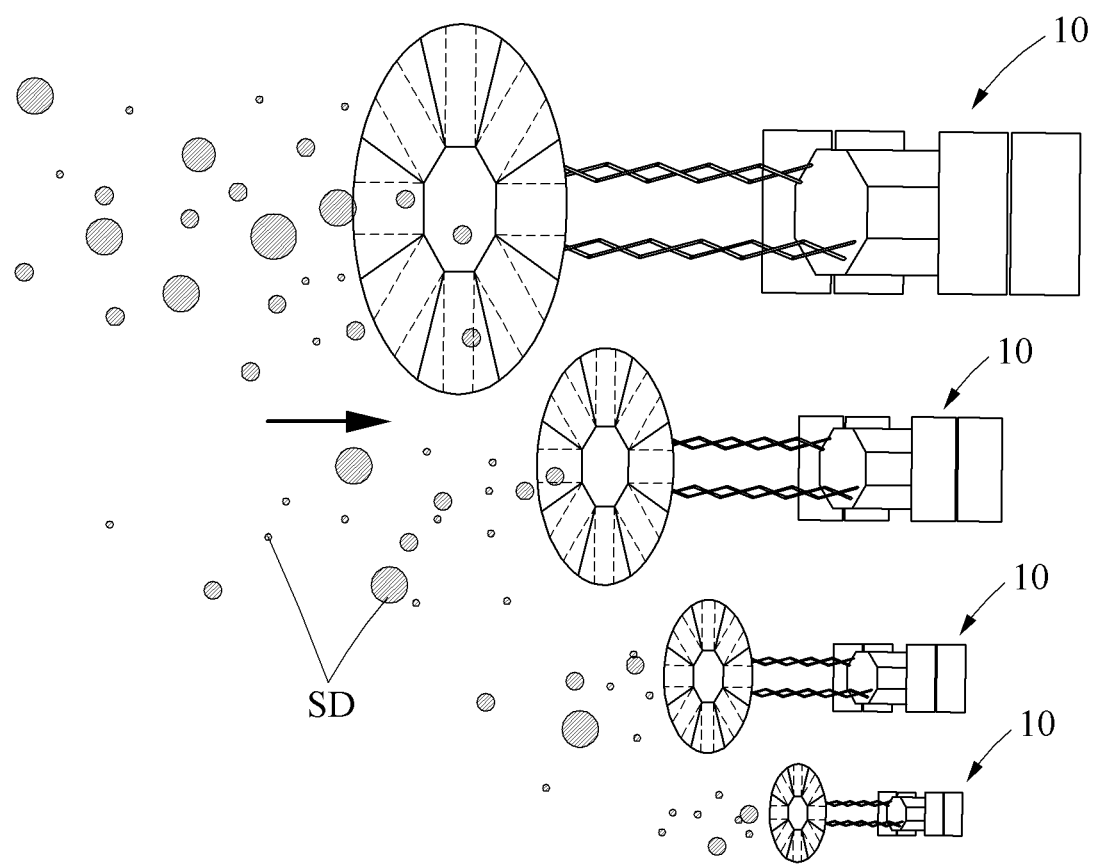
FIG. 12 illustrates an example of a process of how a plurality of spacecrafts for removing space debris removes space debris according to an example embodiment.

Referring to FIG. 12, in a case in which fine space debris approaches extensively, a plurality of space debris removal spacecrafts 10 may be used to remove such a space debris.

As described above, the space debris removal spacecraft 10 may remove large-sized space debris in addition to groups of extremely small-sized space debris, and thus the space debris removal spacecraft 10 may be effective in terms of applicability or scalability.

An example space debris removal spacecraft is described above according to an example embodiment. Also, another example space debris removal spacecraft will be described hereinafter according to another example embodiment.

Figure 13:
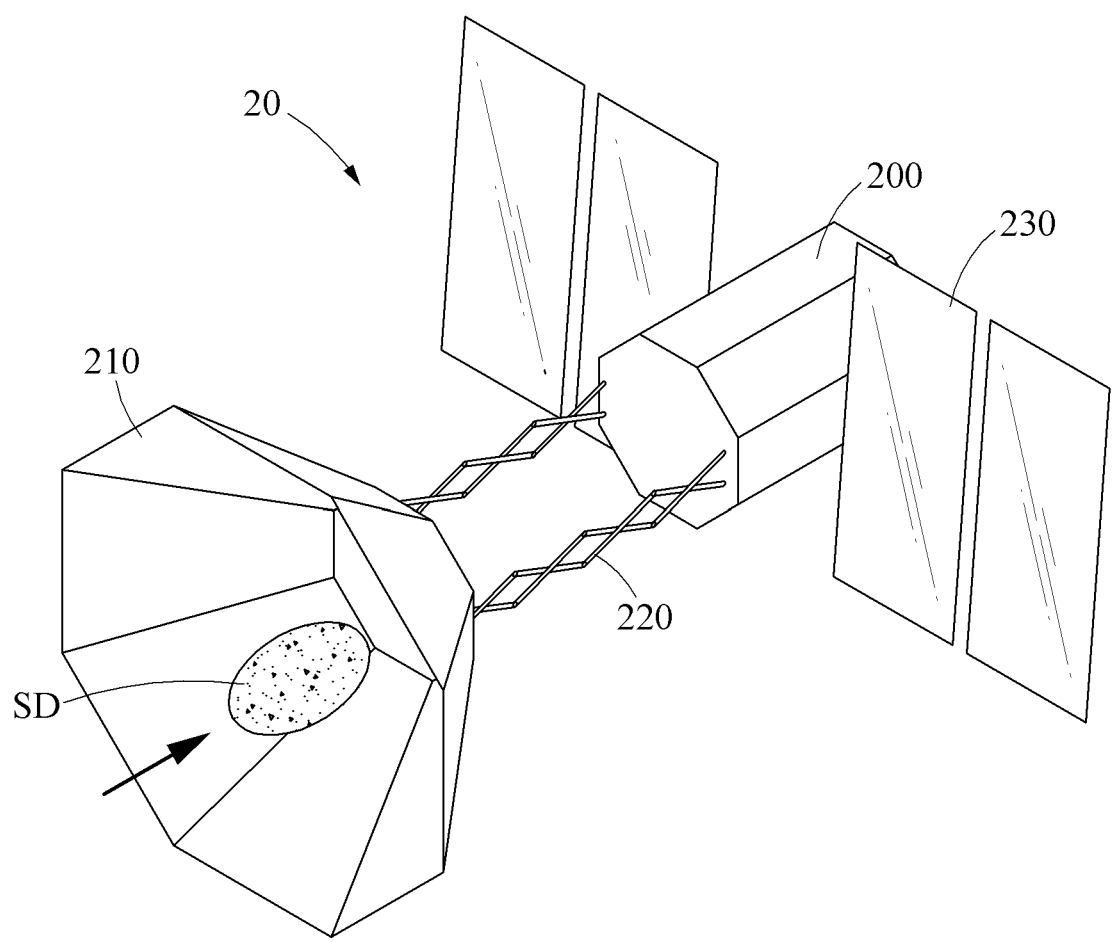
FIG. 13 is a perspective view illustrating another example of a spacecraft for removing space debris according to another example embodiment.
Figure 14B:
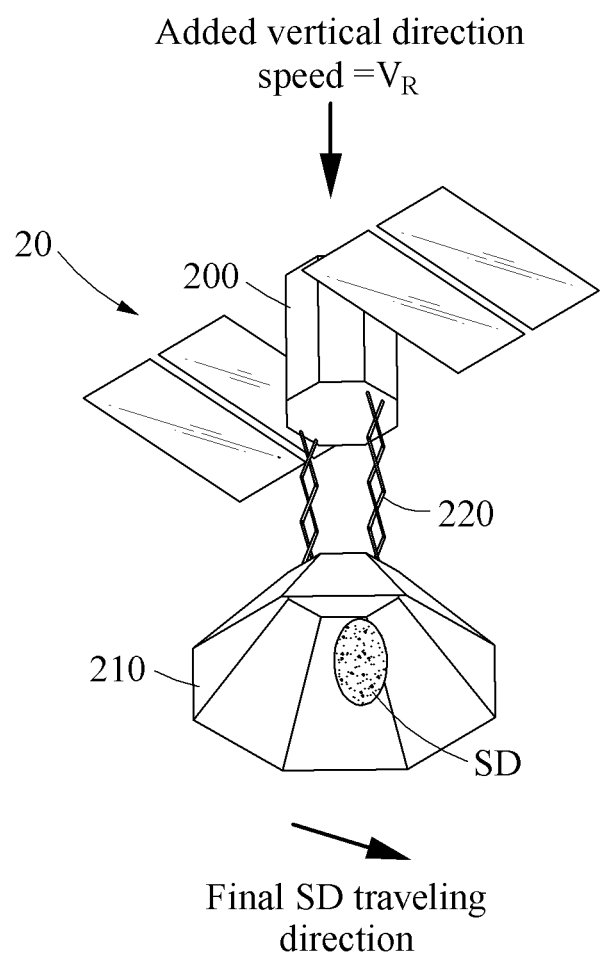

FIG. 13 is a perspective view illustrating another example of a space debris removal spacecraft according to another example embodiment. FIGS. 14A and 14B illustrate another example of a process of how a space debris removal spacecraft removes space debris according to another example embodiment.

Referring to FIG. 13, a space debris removal spacecraft 20 includes a satellite bus 200, a shield member 210, a support member 220, a detection member (not shown), a plurality of thrust members (not shown), and a solar array 230.

The satellite bus 200, the support member 220, the detection member, the thrust members, and the solar array 230 of the space debris removal spacecraft 20 correspond to the satellite bus 100, the support member 120, the detection member 130, the thrust members 140, and the solar array 150 of the space debris removal spacecraft 10, respectively, and thus a detailed and repeated description of such components is omitted for brevity.

The shield member 210 may be provided in a form of a basket, in lieu of a disc shape, to remove a more limited form of space debris, instead of extremely large space debris or a large amount of indiscriminate space debris.

When the space debris is accommodated in the shield member 210, such a form may enable a reduction in a movement speed of the space debris.

Referring to FIGS. 14A and 14B, space debris with a reduced speed in the shield member 210 may be removed as described hereinafter.

A movement speed of the space debris removal spacecraft 20 may be V−ΔV that is less than a movement speed of the space debris, which may be achieved by using a first speed control thrust member corresponding to the first speed control thrust member 142 of FIG. 5 or a second speed control thrust member corresponding to the second speed control thrust member 146 of FIG. 6.

Referring to FIG. 14B, after an attitude or a movement speed of the space debris removal spacecraft 20 is controlled, or a movement speed of space debris reaches a preset value, the attitude of the space debris removal spacecraft 20 may be controlled such that the shield member 210 faces downwards and the satellite bus 200 faces upwards. Here, the attitude of the space debris removal spacecraft 20 may be controlled by using a first attitude control thrust member or a second attitude control thrust member that is provided in the satellite bus 200, which corresponds to the first attitude control thrust member 144 of FIG. 5 or the second attitude control thrust member 148 of FIG. 6, respectively.

Subsequently, an earth-direction speed $V_R$ may be added to the space debris. Here, the earth-direction speed $V_R$ may be added to the space debris by using the first speed control thrust member corresponding to the first speed control thrust member 142 of FIG. 5.

Thus, a final traveling direction of the space debris may be a resultant direction of a direction of a speed V−ΔV of the space debris, which is illustrated in FIG. 14A, and a direction of the earth-direction speed $V_R$, which is illustrated in FIG. 14B. Here, by effectively lowering an altitude of the space debris, a period of time used for the space debris to enter the atmosphere may be reduced.

FIG. 15 is a flowchart illustrating an example of a method of controlling a space debris removal spacecraft according to an example embodiment.

Referring to FIG. 15, a space debris removal spacecraft may be controlled as described hereinafter.

In operation 30, the space debris removal spacecraft including a satellite bus, a shield member connected to the satellite bus, and a detection member provided in a front side of the shield member and configured to obtain information associated with space debris moves in outer space.

In operation 32, the detection member obtains the information associated with the space debris.

In operation 34, an operation of the satellite bus or the shield member is controlled based on the obtained information associated with the space debris.

Here, a movement speed or an attitude of the satellite bus, or a degree of spread of the shield member may be controlled based on external information (i.e. size, shape, the number of the space debris), a relative speed or a movement speed of the space debris.

Additionally, based on the information associated with the space debris that is obtained by the detection member, an operation of a solar array may be controlled such that the solar array is selectively folded to be separated further from the shield member, on a side face of the satellite bus, to be parallel to the satellite bus.

A space debris removal spacecraft described herein may be reusable repeatedly while a fuel of a thrust member is left, and provided in a simple structure to be easily embodied. A life of the space debris removal spacecraft may be extended by using the space debris removal spacecraft on a preset orbit and refueling the space debris removal spacecraft. Further, the space debris removal spacecraft may include a foldable shield member and a foldable solar array to occupy only a minimum space and be launched to outer space. The thrust member provided in a satellite bus of the space debris removal spacecraft may be used to change an attitude of the satellite bus or easily control a movement speed of the satellite bus. The space debris removal spacecraft may reduce a movement speed of the space debris to a desired speed, and then avoid the space debris through an avoidance maneuvering or move further away from the space debris through an acceleration motion.

In addition, the space debris removal spacecraft may be continuously disposed around International Space Station (ISS) or an expensive satellite to act as a bodyguard to protect them. Alternatively, the space debris removal spacecraft may move to a location at which a large amount of space debris is generated, or be launched from the ground in case of a collision with space debris to rapidly remove the space debris before the space debris is spread throughout the earth.

According to example embodiments described herein, a space debris removal spacecraft may be tolerant to accuracy of location coordinates of space debris using a shield member provided in a relatively large size, and effectively remove a large amount of accompanying small-sized space debris along with the space debris.

According to example embodiments described herein, a space debris removal spacecraft may be repeatedly reusable while a fuel of a thrust member is left, and provided in a simple structure to be easily embodied. In addition, a life of the space debris removal spacecraft may be extended by using the space debris removal spacecraft in a designated orbit and refueling the space debris removal spacecraft.

According to example embodiments described herein, a space debris removal spacecraft may be continuously disposed around International Space Station (ISS) or an expensive satellite to act as a bodyguard. Alternatively, the space debris removal spacecraft may move to a location at which a large amount of space debris is generated, or be launched from the ground in case of a collision with space debris to rapidly remove the space debris before the space debris is spread throughout the earth.

According to example embodiments described herein, a space debris removal spacecraft may include a foldable shield member and foldable solar arrays to occupy a minimum space and be launched to outer space. A thrust member provided in a satellite bus of the space debris removal spacecraft may be used to change an attitude of the satellite bus or easily control a movement speed of the satellite bus. The space debris removal spacecraft may decrease a speed of the space debris to a desired speed, and then avoid the space debris by an avoidance maneuvering, or move away from the space debris by an acceleration movement.

According to example embodiments described herein, a space debris removal spacecraft may include a shield member that may be provided in a form of a basket, and control an attitude of a satellite bus and effectively lower an altitude, or a perigee, of space debris to reduce a period of time used for the space debris to enter the atmosphere.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A spacecraft for removing space debris, the spacecraft comprising:
   a satellite bus;
   a shield member variably foldable on an outer side face of the satellite bus and disposed facing towards space debris to reduce a movement speed of the space debris;
   a support member configured to support the shield member with respect to the satellite bus,
   a speed control thrust member configured to control a movement speed of the satellite bus such that the satellite bus is able to approach the space debris or move away from the space debris; and
   an attitude control thrust member configured to adjust an attitude of the satellite bus such that the shield member faces towards the space debris or avoids the space debris;
   wherein:
      the shield member comprises
         a central panel configured to overlap one face of the satellite bus,
         a plurality of first panels connected to peripheral sides of the central panel and radially extended, and
         a plurality of second panels connected between the first panels,
      wherein the speed control thrust member and the attitude control thrust member are disposed on one face or another face of the satellite bus,
      wherein the attitude control thrust member is configured to control the shield member to face towards the earth, and the speed control thrust member is configured to add an earth-direction speed to the space debris and lower an altitude of the space debris.

2. The spacecraft of claim 1, wherein the satellite bus is provided in a form of a polygonal column,
   the first panels correspond in number to faces of the satellite bus, and are configured to overlap the outer side face of the satellite bus, and
   the second panels overlap the first panels.

3. The spacecraft of claim 1, wherein, when the first panels and the second panels are unfolded, the shield member is transformed into a form of a disc or a basket.

4. The spacecraft of claim 1, wherein the support member is provided in a contractible or expandable structure, and
   while the shield member is being unfolded, one end of the support member is connected to one face of the satellite bus, and another end of the support member is connected to a back face of the central panel.

5. The spacecraft of claim 1, further comprising:
a detection member provided at a center of the central panel and configured to detect the space debris, wherein the detection member is configured to measure the movement speed of the space debris or a distance between the space debris and the shield member.

6. The spacecraft of claim 1, further comprising:
a solar array connected to a side face of the satellite bus and configured to convert solar energy to electrical energy in outer space;
a connection member hingedly connected to the side face of the satellite bus; and
a driving member provided in the connection member and configured to rotate the solar array on a drive shaft,
wherein the solar array and the driving member rotate together by a rotation of the connection member.

7. The spacecraft of claim 6, wherein solar cells are provided on one face of the solar array, and not provided on another face of the solar array, and
the solar array is folded, by the connection member, in a direction in which the solar array is separated further from the shield member, on the side face of the satellite bus, to be parallel to the satellite bus.

8. The spacecraft of claim 6, wherein the connection member is provided in an L shape,
wherein a vertex portion in the L shape is hingedly connected to the side face of the satellite bus, and a longitudinally extended portion in the L shape covers an opening formed on the side face of the satellite bus and a laterally extended portion in the L shape is inserted in the satellite bus,
wherein the longitudinally extended portion in the L shape rotates on the vertex portion in the L shape outside the satellite bus, and the laterally extended portion in the L shape rotates on the vertex portion in the L shape inside the satellite bus.

9. The spacecraft of claim 7, wherein:
the controller is in communication with the driving member and the solar array,
the controller is configured to move the solar array in response to approaching debris, and
when the space debris approaches, the solar array is rotated by the driving member such that one face of the solar array is disposed in a direction opposite to that of the shield member, and then is folded in a direction in which the solar array is separated further from the shield member, on the side face of the satellite bus, by the connection member such that one face of the solar array is parallel to the side face of the satellite bus.

10. The spacecraft of claim 7, further comprising:
an insulation member provided in the connection member and configured to prevent the driving member from being externally exposed.

11. A spacecraft for removing space debris, comprising:
a satellite bus;
a shield member connected to the satellite bus and configured to reduce a movement speed of space debris;
a detection member provided in a front side of the shield member and configured to obtain information associated with the space debris; and
a controller configured to control an operation of the satellite bus or the shield member based on the information associated with the space debris that is obtained by the detection member,
wherein the controller is configured to control a movement speed of the satellite bus, an attitude of the satellite bus, or a degree of spread of the shield member, based on external information, a relative speed or the movement speed of the space debris,
wherein, when the space debris is captured by the shield member, the controller is configured to control the movement speed of the satellite bus, change the attitude of the satellite bus to allow the shield member to face towards the space debris, and control the degree of spread of the shield member such that the shield member is able to accommodate the space debris,
wherein, when the space debris is captured in the shield member, the controller is configured to maintain the movement speed of the satellite bus to be less than the movement speed of the space debris, and control the movement speed of the satellite bus to allow the movement speed of the space debris to reach a preset speed,
wherein the controller is configured to change the attitude of the satellite bus such that the shield member faces towards the earth, and increase the movement speed of the satellite bus to add an earth-direction speed to the space debris.

12. The spacecraft of claim 11, wherein the controller is configured to control the movement speed of the satellite bus to be greater than the movement speed of the space debris such that the satellite bus is positioned in front of the space debris in a travelling direction of the space debris.

13. The spacecraft of claim 11, wherein, in response to the movement speed of the space debris being reduced by the shield member, the controller is configured to change the attitude of the satellite bus such that the shield member avoids the space debris, and increase the movement speed of the satellite bus such that the shield member moves further away from the space debris.

14. A method of controlling a spacecraft for removing space debris, the method comprising:
moving, in outer space, the spacecraft comprising a satellite bus, a shield member connected to the satellite bus, and a detection member provided in a front side of the shield member and configured to obtain information associated with space debris;
obtaining, by the detection member, the information associated with the space debris; and
controlling an operation of the satellite bus or the shield member based on the obtained information associated with the space debris,
wherein the controlling of the operation of the satellite bus or the shield member based on the obtained information comprises:
controlling a movement speed of the satellite bus, an attitude of the satellite bus, or a degree of spread of the shield member, based on external information, a relative speed or a movement speed of the space debris,
wherein the spacecraft further comprises a solar array connected to a side face of the satellite bus and configured to convert solar energy to electrical energy in outer space, and
the controlling of the operation of the satellite bus or the shield member based on the obtained information comprises:
controlling an operation of the solar array such that the solar array is folded in a direction in which the solar array is separated further from the shield member, on the side face of the satellite bus, to be parallel to the satellite bus, based on the obtained information.

* * * * *